United States Patent
Larsson et al.

(10) Patent No.: US 10,351,632 B2
(45) Date of Patent: Jul. 16, 2019

(54) OXYGEN BARRIERS BASED ON MODIFIED CELLULOSE FIBERS

(71) Applicant: Billerudkorsnas AB, Solna (SE)

(72) Inventors: Per Larsson, Danderyd (SE); Lars Wagberg, Stockholm (SE)

(73) Assignee: BillerudKorsnas AB, Solna (SE)

(*) Notice: Subject to any disclaimer, the term of this patent is extended or adjusted under 35 U.S.C. 154(b) by 0 days.

(21) Appl. No.: 15/740,446

(22) PCT Filed: Jun. 30, 2016

(86) PCT No.: PCT/SE2016/050663
§ 371 (c)(1),
(2) Date: Dec. 28, 2017

(87) PCT Pub. No.: WO2017/003364
PCT Pub. Date: Jan. 5, 2017

(65) Prior Publication Data
US 2018/0194863 A1   Jul. 12, 2018

(30) Foreign Application Priority Data

Jun. 30, 2015 (SE) ...................... 1550923

(51) Int. Cl.
*C08J 5/18* (2006.01)
*C08L 1/04* (2006.01)
(Continued)

(52) U.S. Cl.
CPC .............. *C08B 15/02* (2013.01); *B32B 23/02* (2013.01); *B32B 23/04* (2013.01); *B32B 29/002* (2013.01);
(Continued)

(58) Field of Classification Search
CPC ........ D21H 27/10; D21H 13/02; D21H 11/18; D21H 21/16; D21H 27/38;
(Continued)

(56) References Cited

U.S. PATENT DOCUMENTS

2010/0316863 A1* 12/2010 Kumamoto .............. C08J 7/047
428/292.1
2011/0281487 A1* 11/2011 Mukai ....................... B32B 5/02
442/335
(Continued)

FOREIGN PATENT DOCUMENTS

CA   2923165 A1 *  3/2015  ................ C08L 1/04
CA   2990156 A1 *  1/2017  ............. B32B 23/02
(Continued)

OTHER PUBLICATIONS

Linvill et al., "Dynamic Mechanical Thermal Analysis Data of Sheets Made from Wood-Based Cellulose Fibers partially Converted to DialcoholCellulose," Elsevier, 14, pp. 504-506 (Year: 2017).*
(Continued)

*Primary Examiner* — Jose A Fortuna
(74) *Attorney, Agent, or Firm* — Stites & Harbison PLLC; Richard S. Myers, Jr.

(57) ABSTRACT

There is provided a use of a material comprising fibers as an oxygen barrier, wherein the fibers comprise native cellulose and dialcohol cellulose. There is also provided a material comprising fibers and having a density of at least 1200 kg/m³, wherein the fibers comprise native cellulose and dialcohol cellulose and the oxygen permeability of the material according to ASTM D3985 is below 30 ml·μm/(m²·kPa·24 h) at 23° C. and 80% relative humidity.

23 Claims, 5 Drawing Sheets

(51) Int. Cl.

| | | |
|---|---|---|
| *B32B 23/02* | (2006.01) | |
| *B32B 23/04* | (2006.01) | |
| *B32B 29/00* | (2006.01) | |
| *D21H 11/20* | (2006.01) | |
| *D21H 13/02* | (2006.01) | |
| *D21H 19/34* | (2006.01) | |
| *D21H 19/52* | (2006.01) | |
| *D21H 27/10* | (2006.01) | |
| *D21H 27/30* | (2006.01) | |
| *C08L 1/00* | (2006.01) | |
| *C08B 15/02* | (2006.01) | |

(52) U.S. Cl.
CPC .............. *B32B 29/005* (2013.01); *C08J 5/18* (2013.01); *C08L 1/00* (2013.01); *C08L 1/04* (2013.01); *D21H 11/20* (2013.01); *D21H 13/02* (2013.01); *D21H 19/34* (2013.01); *D21H 19/52* (2013.01); *D21H 27/10* (2013.01); *D21H 27/30* (2013.01); *B32B 2262/04* (2013.01); *B32B 2262/062* (2013.01); *B32B 2262/067* (2013.01); *B32B 2307/31* (2013.01); *B32B 2307/72* (2013.01); *B32B 2307/7242* (2013.01); *B32B 2307/7244* (2013.01); *B32B 2317/18* (2013.01); *B32B 2439/40* (2013.01); *B32B 2553/00* (2013.01); *C08J 2301/04* (2013.01); *C08L 2201/14* (2013.01)

(58) Field of Classification Search
CPC .... B32B 2307/7242; B32B 2307/7244; B32B 23/02; B32B 23/04; B32B 2553/00; B32B 2262/04; B32B 2262/067; B32B 2307/31; B32B 2307/72; B32B 2317/18; B32B 2439/40; B32B 23/00; C08L 1/04; C08L 1/00; C08L 2201/14; C08L 2205/16; C08B 15/02; C08B 15/00; C08J 2301/04; C08J 5/18

See application file for complete search history.

(56) References Cited

U.S. PATENT DOCUMENTS

| | | | |
|---|---|---|---|
| 2012/0000392 A1* | 1/2012 | Mukai | C08B 15/02 106/163.01 |
| 2013/0022827 A1* | 1/2013 | Imai | B32B 27/12 428/446 |
| 2013/0260143 A1* | 10/2013 | Oomori | C09D 101/286 428/336 |
| 2014/0220281 A1* | 8/2014 | Black | C07D 307/89 428/36.92 |
| 2016/0214357 A1* | 7/2016 | Larsson | C08L 1/04 |
| 2018/0194863 A1* | 7/2018 | Larsson | B32B 23/02 |

FOREIGN PATENT DOCUMENTS

| | | | | |
|---|---|---|---|---|
| JP | 11323783 A | * | 11/1999 | |
| JP | HII 323783 A | | 11/1999 | |
| WO | WO-2013164646 A1 | * | 11/2013 | ............ D21H 27/10 |
| WO | WO 2014/062129 A1 | | 4/2014 | |
| WO | WO 2015/034426 A1 | | 3/2015 | |
| WO | WO-2017003364 A1 | * | 1/2017 | ............ B32B 23/02 |
| WO | WO-2017095831 A1 | * | 6/2017 | ............ C08B 15/00 |
| WO | WO-2018069482 A1 | * | 4/2018 | |
| WO | WO-2018135994 A1 | * | 7/2018 | ............ C08B 15/02 |

OTHER PUBLICATIONS

Per A. Larsson et al: "Ductile All-Cellulose Nanocomposite Films Fabricated from Core-Shell Structured Cellulose Nanofibrils", Biomacromolecules, vol. 15, No. 6, Apr. 28, 2014 (Apr. 28, 2014), pp. 2218-2223.

Wakako Kasai et al: 11 Mechani cal properties of films made from dialcohol cellulose prepared by homogeneous periodate oxidation 11, Cellulose, vol. 21, No. 1, Dec. 31, 2013 (Dec. 31, 2013), pp. 769-776.

Christian Aulin et al: 11 Transparent Nanocellulosic Multilayer Thin Films on Polylactic Acid with Tunable Gas Barrier Properties 11, ACS Applied Materials and Interfaces, vol. 5, No. 15, Jul. 8, 2013 (Jul. 8, 2013), pp. 7352-7359.

Kumar Vi Nay et al: 11 Compari son of nano-and microfibrillated cellulose films 11, Cellulose, Springer Netherlands, Netherlands, vol. 21, No. 5, Jul. 19, 2014 (Jul. 19, 2014), pp. 3443-3456.

* cited by examiner

OXYGEN BARRIERS BASED ON MODIFIED CELLULOSE FIBERS

CROSS REFERENCE TO RELATED APPLICATIONS

This application is a § 371 National State Application of PCT/SE2016/050663 filed Jun. 30, 2016, which claims priority to SE 1550923-5 filed Jun. 30, 2015.

TECHNICAL FIELD

The present invention relates to the field of oxygen barriers.

BACKGROUND

Cellulose is probably the most abundant biopolymer on Earth, and it is considered to be an important component in a future, sustainable and bio-based economy.

However, for materials based on cellulose fibers to be able to replace materials with higher ecological footprint (e.g. petroleum-based plastics), they need in many applications to provide an oxygen barrier.

Larsson et al. (*Biomacromolecules* 2014, 15, 2218-2223) describes the fabrication and characterization of nanocomposite films made of core-shell modified cellulose nanofibrils (CNFs) surrounded by a shell of ductile dialcohol cellulose, created by heterogeneous periodate oxidation followed by borohydride reduction of the native cellulose in the external parts of the individual fibrils. The oxidation with periodate selectively produces dialdehyde cellulose, and the process did not increase the charge density of the material. Yet the modified cellulose fibers could easily be homogenized to CNFs shown to be 0.5-2 µm long and 4-10 nm wide. Films were fabricated by slow filtration. At a relative humidity of 80%, the films acted as a good oxygen barrier.

A major drawback the produced CNFs is however that they are very difficult to dewater and film formation times of several hours are common, which significantly limits their use in industrial scale processes.

At the same time, the general understanding in the field has been that materials based on cellulose fibers, such as paper materials, cannot exhibit satisfactory oxygen barrier properties, especially not at a high relative humidity. It has been believed that the fibrous nature of such materials prevents the formation of structures that are dense enough to prevent penetration by gaseous oxygen.

SUMMARY

The present inventors have however found that a material based on cellulose fibers, which are easily dewatered compared to cellulose fibrils, exhibits oxygen-barrier properties if the cellulose of the fibers is partly converted to dialcohol cellulose.

The following is an itemized listing of various embodiments of the present disclosure.

1. Use of a material comprising fibers as an oxygen barrier, wherein the fibers comprise native cellulose and dialcohol cellulose.

2. Use of a material according to item 1 at a relative humidity of at least 80%.

3. Use according to item 1 or 2, wherein the material is a paper sheet.

4. Use according to item 3, wherein the paper sheet is part of a multilayered paper or board product.

5. Use according to item 1 or 2, wherein the material is a coating on a substrate.

6. Use according to any one of the previous items, wherein the density of the material is at least 1200 kg/m$^3$.

7. Use according to any one of the previous items, wherein the fibers are wood fibers.

8. Use according to any one of the previous items, wherein the fibers are obtainable by oxidizing part of the cellulose in a fiber suspension to dialdehyde cellulose followed by reduction of dialdehyde cellulose to obtain the dialcohol cellulose.

9. A material comprising fibers and having a density of at least 1200 kg/m$^3$, wherein the fibers comprise native cellulose and dialcohol cellulose and the oxygen permeability of the material according to ASTM D3985 is below 30 ml·µm/(m$^2$·kPa·24 h) at 23° C. and 80% relative humidity.

10. The material of item 9, wherein the fibers are obtainable by a method comprising oxidizing part of the cellulose in a fiber suspension to dialdehyde cellulose followed by reduction of dialdehyde cellulose to obtain the dialcohol cellulose.

11. The material of item 10, wherein the degree of conversion to dialdehyde cellulose is above 13%, such as above 18%, such as above 20%.

12. The material of item 10 or 11, wherein the degree of conversion to dialdehyde cellulose is below 60%, such as below 50%.

13. The material of any one of items 10-12, wherein the degree of conversion to dialdehyde cellulose is between 22% and 49%, such as between 24% and 45%.

14. The material of any one of items 10-13, wherein the Schopper Riegler number of the fiber suspension is at least 15° SR, such as at least 20° SR, such as at least 25° SR, such as at least 30° SR.

15. The material of any one of items 9-14, wherein the density is at least 1250 kg/m$^3$, such as at least 1300 kg/m$^3$.

16. The material of any one of items 9-15, wherein the density is less than 1600 kg/m$^3$.

17. The material of any one of items 9-16, wherein the oxygen permeability according to ASTM D3985 is below 25 or 15 ml·µm/(m$^2$·kPa·24 h) at 23° C. and 80% RH, such as below 12 or 10 ml·µm/(m$^2$·kPa·24 h) at 23° C. and 80% RH.

18. A paper sheet consisting of the material of any one of items 9-17.

19. A paper sheet according to item 18, wherein the total transmittance is least 40%, such as at least 50%, such as at least 60%, such as at least 70% measured at a wavelength of 550 nm with a Shimadzu UV-2550UV-vis spectrophotometer equipped with its integrating sphere accessory.

20. A paperboard material comprising a paper sheet according to item 18 or 19.

21. A packaging material comprising a paper sheet according to item 18 or 19 or a layer composed of the material according any one of items 9-17.

22. The packaging material of item 21, which is a multilayered material.

23. A packaging material comprising a substrate provided with a coating consisting the material according to any one of items 9-17.

24. Method of forming a package component having a three-dimensional shape, comprising the step of press-forming the paper sheet of item 18 or 19, the paperboard material of item 20 or the packaging material of item 21 such that it obtains the three-dimensional shape.

25. Method according to item 24, wherein the total transmittance of the package component obtained from the press forming of the paper sheet is at least 60%, such as at least 70% measured at a wavelength of 550 nm with a Shimadzu UV-2550UV-vis spectrophotometer equipped with its integrating sphere accessory.

26. Method according to item 24 or 25, wherein the haze of the package component obtained from the press forming of the paper sheet is less than 40%, such as less than 30% measured at a wavelength of 550 nm with a Shimadzu UV-2550UV-vis spectrophotometer equipped with its integrating sphere accessory.

27. Method of forming a package, comprising the step of heat-sealing a paper sheet, paperboard material or packaging material according to any one of items 18-23.

BRIEF DESCRIPTION OF THE DRAWINGS

FIG. 4 shows the DMTA of some of the sheets from FIG. 2. FIG. 4A shows the storage modulus and FIG. 4B shows tan δ. Each curve is the average of four measurements.

DETAILED DESCRIPTION

As a first aspect of the present disclosure, there is thus provided a use of a material comprising fibers as an oxygen barrier, wherein the fibers comprise native cellulose and dialcohol cellulose.

In the context of the present disclosure, "fibers" have an average diameter of at least 1 µm. The average diameter of the fibers of the present disclosure is normally at least 5 µm, such as at least 8 µm, such as at least 12 µm.

The average length of the fibers of the present disclosure is preferably at least 0.3 mm, such as 0.3-4 mm.

The fibers of the present disclosure are preferably of lignocellulosic origin.

Further, the "fibers" of the present disclosure are preferably wood fibers.

In one embodiment, the oxygen permeability according to ASTM D3985 of the material is below 50 or 30 ml·µm/(m$^2$·kPa·24 h) at 23° C. and 80% relative humidity (RH). Preferably, the oxygen permeability according to ASTM D3985 is below 25 ml·µm/(m$^2$·kPa·24 h) at 23° C. and 80% RH. It may also be below 15, 12 or 10 ml·µm/(m$^2$·kPa·24 h) at 23° C. and 80% RH.

The fibers of the material are obtainable by a method comprising oxidizing part of the cellulose in a fiber suspension to dialdehyde cellulose followed by reduction of dialdehyde cellulose to obtain the dialcohol cellulose.

In the preparation of the fibers of the present disclosure, the degree of conversion of cellulose to dialdehyde cellulose prior to reduction to dialcohol cellulose is preferably above 13%, such as above 18% or above 20%. Further, the degree of conversion may be below 60%, such as below 50%. In one embodiment, the degree of conversion is between 22% and 49%, such as between 24% and 45%.

The degree of conversion of cellulose to dialdehyde cellulose can be determined using the method "carbonyl content determination" described below.

The fiber suspension used in the method for preparing the fibers of the material may be a suspension of beaten fibers.

The Schopper Riegler number (° SR) represents the drainability of a fiber suspension and constitutes a useful index of the amount of mechanical treatment, e.g. beating, to which the fiber suspension has been subjected. Accordingly, the dewatering resistance of the fiber suspension may be at least 15° SR, such as at least 20° SR, such as at least 25° SR, such as at least 30° SR.

It has been found that oxygen barrier properties are obtained also at a high relative humidity, i.e. 80%. As many applications require the oxygen barrier to be effective at such a high relative humidity, the use of the first aspect is particularly beneficial. Accordingly, the use of the first aspect is at a relative humidity of at least 80%, such as at least 90%.

The material preferably has the form of a sheet or a film. The thickness of such a sheet or film may be 10-250 µm, such as 20-200 µm, such as 30-200 µm, such as 50-170 µm. The material may for example be a paper sheet, which is material of fibrous structure. Such a paper sheet may form an oxygen-barrier layer of a multilayered paper or board product. The multilayered product may be a laminate of layers produced independently of each other. For example, the oxygen-barrier layer may be laminated to at least one paper layer of fibers that do not comprise dialcohol cellulose. Alternatively, the multilayered product may be formed already in the paper machine. For example, the oxygen-barrier layer can be formed by one headbox, while another paper layer, such as a layer of fibers that do not contain dialcohol cellulose, is formed by another headbox in the same machine. The use of multiple headboxes in the same paper machine is well-known in the field of paper making. It is also possible to use a stratified head box to form the layers of a multilayered product.

In one embodiment of the multilayered product, the oxygen-barrier layer is sandwiched between two layers of unmodified fibers. Thereby, the oxygen-barrier layer is protected. If such a sandwiched product is produced already in the paper machine, problems related to an elevated stickiness of the dialcohol cellulose fibers compared to unmodified fibers are avoided.

In another embodiment of the first aspect, the material is a coating on a substrate. In such an embodiment, a suspension of the fibers comprising cellulose and dialcohol cellulose may be applied to the substrate and the material may be formed when the suspension dries to form the coating.

The density of the material of the first aspect is preferably at least 1200 kg/m$^3$, such as at least 1250 kg/m$^3$, such as at least 1300 kg/m$^3$. To reach such a high density, beaten fibers may be selected for the partial conversion to dialcohol cellulose. Alternatively, or as a complement, a sheet of the fibers comprising dialcohol cellulose may be pressed, e.g. at a pressure of at least 3 MPa, such as at least 5, 10, 15 or 20 MPa.

In a pressing operation, the material may be heated to a temperature of 70-220° C., preferably 70-200° C., such as 80-160° C., such as 80-140° C.

Such pressing operation may be carried by means of a tool having a temperature of 45-320° C., such as 50-300° C., such as 70-250° C., such as 70-220° C. The tool may for example be a roll in a calender. The tool may also be a male and/or a female tool in a press-forming operation. Press-forming is discussed further below.

An alternative or a complement to a hot tool is heating of the material with hot air or steam.

In some applications, a transparent material is desired and the material of the present disclosure may have a relatively high transparency. For example, the total transmittance of a sheet or film of the material may be at least 40%, such as at least 50%, such as at least 60%, such as at least 70% measured at a wavelength of 550 nm with a Shimadzu UV-2550UV-vis spectrophotometer equipped with its integrating sphere accessory.

Low haze is another property that is desired in some applications. The haze of a sheet or film of the material of the present disclosure may for example be less than 60%, such as less than 50%, such as less than 40%, such as less than 30% measured at a wavelength of 550 nm with a Shimadzu UV-2550UV-vis spectrophotometer equipped with its integrating sphere accessory.

The thickness of a sheet or film having such a transparency and/or haze is preferably 50-250 μm, such as 50-200 μm, such as 70-200 μm, such as 80-170 μm.

As a second aspect of the present disclosure, there is provided a material comprising fibers and having a density of at least 1200 kg/m$^3$, such as at least 1250 kg/m$^3$, such as at least 1300 kg/m$^3$. The fibers comprise native cellulose and dialcohol cellulose. The oxygen permeability of the material according to ASTM D3985 is below 50 or 30 ml·μm/(m$^2$·kPa·24 h) at 23° C. and 80% relative humidity.

Even though the embodiments of the first aspect apply to the second aspect mutatis mutandis, a few embodiments of the second aspect are discussed below in some detail.

The oxygen permeability according to ASTM D3985 of the material is preferably below 15 ml·μm/(m$^2$·kPa·24 h) at 23° C. and 80% RH, such as below 12 or 10 ml·μm/(m$^2$·kPa·24 h) at 23° C. and 80% RH.

The material of the second aspect may be a film or a sheet, such as a paper sheet. The sheet may form a layer of multilayered paper or paperboard product. In another embodiment, the material of the second aspect forms a coating on a substrate. Such a coated substrate may be a packaging material.

The paper sheet may be transparent. Accordingly the total transmittance of the paper sheet may be least 40%, such as at least 50%, such as at least 60%, such as at least 70% measured at a wavelength of 550 nm with a Shimadzu UV-2550UV-vis spectrophotometer equipped with its integrating sphere accessory. The thickness of a paper sheet having such a transparency is preferably 50-250 μm, such as 50-200 μm, such as 70-200 μm, such as 80-170 μm. Further, the haze of the paper sheet may be as defined above.

It follows from the above that the present disclosure presents a paperboard material comprising a paper sheet according to the second aspect. The paperboard material preferably has multiple layers. Various embodiments of multilayered paperboard are described above. The grammage (ISO 536) of the paperboard material of the present disclosure may for example be 120-800 g/m$^2$, such as 150-600 g/m$^2$, such as 224-500 g/m$^2$. The thickness (ISO 534) of the paperboard material of the present disclosure may for example be 200-800 μm, such as 250-600 μm.

It has unexpectedly been found that the material of the present disclosure has thermoplastic properties. Therefore, there is also provided a method of forming a package component having a three-dimensional shape. Such a method comprises the step of press-forming the above-mentioned paper sheet, the paperboard material or coated substrate such that it obtains the three-dimensional shape. In the press-forming operation, the material may be heated to a temperature of 70-220° C., preferably 70-200° C., such as 80-160° C., such as 80-140° C.

The pressing not only results in a three-dimensional shape, it may also increase the transparency and/or lower the haze of the paper sheet. Accordingly, the package component may have a total transmittance above 60 or 70% and/or a haze below 50 or 40% (measured as described above) after press-forming of the paper sheet.

Sealing properties in general and heat sealing properties in particular are desired for gas barriers in package application. The peel test described below shows that two layers of the material of the present disclosure can be sealed to each other by means of heating. Accordingly, there is provided a method of forming a package, comprising the step of sealing, preferably heat-sealing, the paper sheet (described above), paperboard material (described above) or packaging material (described above). In the sealing, two surfaces of the material of the second aspect may be sealed to each other, e.g. by means of pressure and/or heating. In the sealing operation, the material may be heated to a temperature of 70-220° C., such as 70-200° C., such as 80-200° C., such as 90-180° C. The pressure in the sealing operation may be at least 3 MPa, such as at least 5, 10, 15 MPa.

EXAMPLES

Materials

Fibers

Bleached softwood kraft fibers (K46) were supplied by SCA Forest Products (Östrand pulp mill, Timrå, Sweden). One part of the material was left non-beaten and one was beaten in a Voith mill to an energy input of 160 Wh/kg (about 30° SR). Small-particle material, so called fines, was removed from both the non-beaten (3-4%) and the beaten (8-10%) fibers using a Britt Dynamic Drainage Jar.

Chemicals

Sodium (meta)periodate was provided by Alfa Aesar (98%), and sodium borohydride and hydroxylamine hydrochloride were supplied by Sigma-Aldrich. Other chemicals such as hydrochloric acid, sodium hydroxide, isopropanol (≥99.8% purity) and sodium phosphate were of analytical grade.

Methods

Fiber Modification

The fibers were partly oxidized to dialdehyde cellulose by adding 5.4 gram of periodate per gram of fiber to a gently stirred beaker at a fiber concentration of 4 g/l. To limit formation of radicals and unwanted side reactions, the reaction was performed in the dark. After 6 h, 12 h or 24 h of oxidation, the reaction was stopped by filtration and washing of the fibers. The fibers were then suspended to 4 g/l and the dialdehyde cellulose formed was reduced to dialcohol cellulose by adding 0.5 gram sodium borohydride per gram of fiber. To limit the pH increase upon addition of sodium borohydride, monobasic sodium phosphate was added together with the borohydride at an amount corresponding to 0.01 M. The reduction time was kept constant at 4 h, followed by filtration and thorough washing.

Carbonyl Content Determination

The carbonyl content was determined by a protocol based on Zhao et al. (*Determination of degree of substitution of formyl groups in polyaldehyde dextran by the hydroxylamine hydrochloride method*. Pharm. Res. 8:400-402 (1991)). The fibers were suspended in water and adjusted to pH 4, followed by dewatering to a gel-like consistency. Then, approximately 0.25 g (dry basis) of these fibers were stirred with 25 ml of 0.25 M hydroxylamine hydrochloride solution at pH 4 for at least 2 h before the fibers were separated from the solution by filtration using a pre-weighed filter paper. The exact mass of the fibers was then determined by oven-drying of the filter paper and the carbonyl amount was determined by titration back to pH 4 with 0.10 M sodium hydroxide. Two to three independent oxidations were performed at each oxidation time, and each reaction with hydroxylamine hydrochloride was performed in triplicate.

Sheet Preparation

Handsheets with an approximate grammage of 150 g/m$^2$ were prepared using tap water in a Rapid Köthen sheet former (Paper Testing Instruments, Austria). The sheets were dried at 93° C. and under a reduced pressure of 95 kPa, first for 15 min between 400 mesh woven metal wires attached to regular sheet-former carrier boards, and then 2 min between ordinary carrier boards. The sheets were then stored at 23° C. and 50% RH until further testing.

Pressing

Circular samples with a diameter of 40 mm were hot-pressed between two bright annealed steel discs in a Fontijne TP400 press (Fontijne Grotnes, The Netherlands) for all further analysis, except for peel testing were rectangular (20 mm wide and 63 mm long) steel plates of the same area were used. The combination of pressure, temperature and time was 16 MPa, 150° C. and 2 min.

Thickness and Density

Thickness was determined, before and after pressing, as the average structural thickness according to SCAN-P 88:01. The thickness was then used together with the area and the mass of the test piece to calculate the material density.

Dynamic Mechanical Thermal Analysis (DMTA)

DMTA was performed on a TA Instruments Q800 operating in the tensile mode. The oscillation frequency and amplitude were 1 Hz and 10 µm, respectively, and temperature scans were performed at a rate of 3° C./min in the temperature range of 20-300° C. (or until sample failure). For each degree of modification, four replicated were tested; using test pieces that had an approximate width of 3 mm, a thickness of 100-180 µm and a distance between the clamps of about 8 mm.

Peel Testing

Figure 5A:
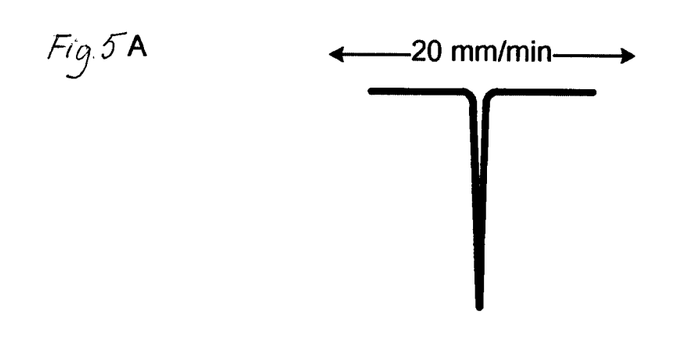
FIG. 5A shows a schematic setup of a t-peel test.

T-peel testing was performed on an Instron 5944, equipped with a 500 N load cell, at a controlled climate of 23° C. and 50% RH using a strain rate of 20 mm/min. Prior to testing, two 20 mm wide strips of modified cellulose were hot-pressed as described above, fusing them in the middle and leaving four free ends. The fused strips were then cut in half to give two T-shaped test pieces with a 20 mm wide and approximately 30 mm long fused area. A total of four test pieces were evaluated. See also FIG. 5.

Optical

The optical properties of the pressed and non-pressed sheets were analyzed with a Shimadzu UV-2550 UV-vis spectrophotometer equipped with its integrating sphere accessory. Each sample was analyzed at three random spots, and three non-pressed and two pressed samples were evaluated for each degree of modification.

Oxygen Permeability

The oxygen permeability was evaluated on 5 cm$^2$ samples using a MOCON (Minneapolis, Minn., USA) OX-TRAN 2/21 according to the ASTM D3985 standard. The oxygen permeability measurements were performed at 23° C. and 50% RH or 80% RH, using the same relative humidity on both sides of the sample. For samples displaying barrier properties, four samples were evaluated at each relative humidity.

Results

Carbonyl Content

Figure 1:
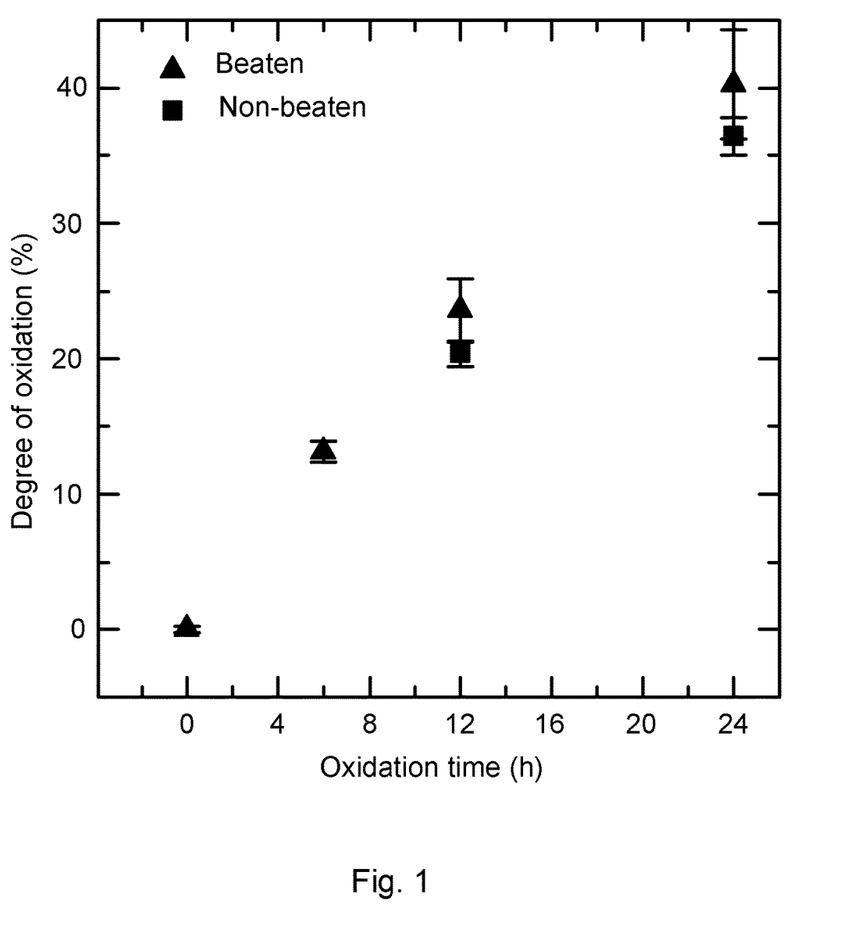
FIG. 1 shows the degree of oxidation as function of reaction time for beaten and non-beaten fibers.

The degree of oxidation as function of reaction time for beaten and non-beaten fibers is shown in FIG. 1. In the range of 0-40%, the degree of oxidation increases with the reaction time. The degree of oxidation may thus be controlled by controlling the reaction time.

The increase is roughly linear for both beaten and non-beaten fibers. The oxidation rate is however slightly higher for the beaten fibers.

Density & Pressability

Figure 2:
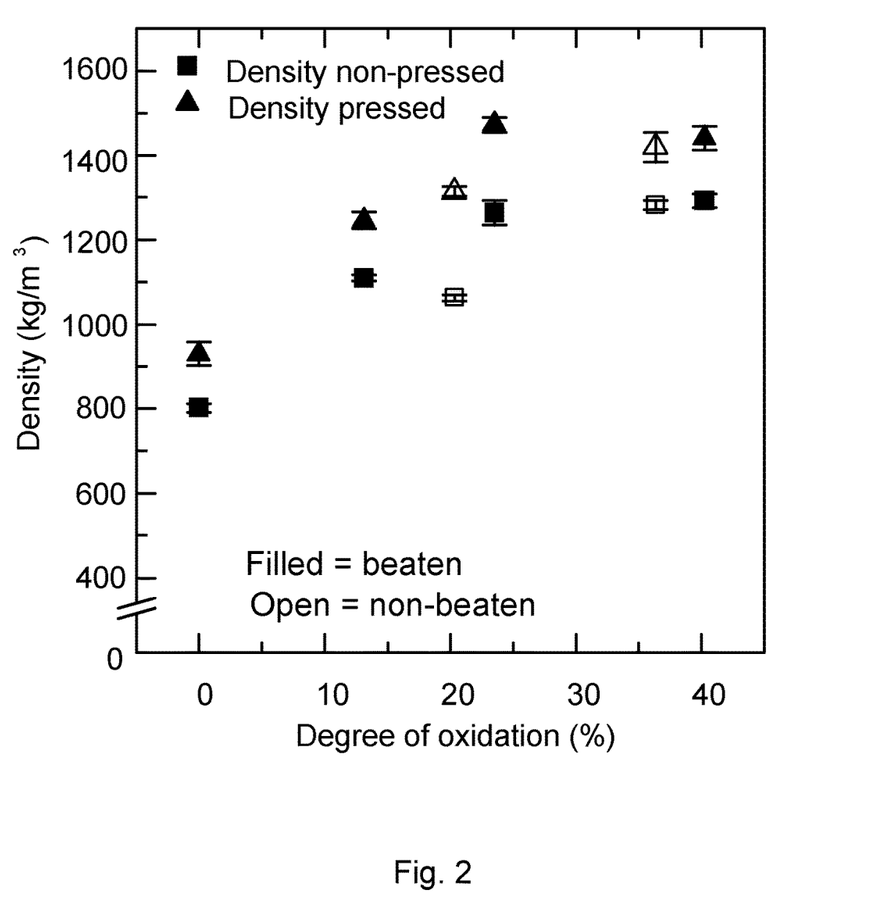
FIG. 2 shows densities before and after hot pressing for 2 min at 150° C. and 16 MPa of various fiber sheets produced from beaten or non-beaten fibers. The degree of conversion to dialdehyde cellulose in the preparation of the dialcohol-containing fibers used for the sheets is 0%, 13%, 20%, 24%, 36% or 40%. The values presented in FIG. 2 are means of a minimum of eight measurements and are given with 95% confidence limits.

The densities of the produced sheets before and after hot pressing for 2 min at 150° C. and 16 MPa are shown FIG. 2.

It is shown that sheet densities above 1200 kg/m$^3$ are obtained when the degree of oxidation prior to reduction to dialcohol cellulose is 24%, 36% or 40% irrespective of if the fibers were beaten or not or if the sheets were pressed or not. For sheets of non-beaten fibers oxidized to 20% prior to reduction to dialcohol cellulose or beaten fibers oxidized to 13% prior to reduction to dialcohol cellulose, densities above 1200 kg/m$^3$ were obtained only after pressing. Sheets of non-modified beaten fibers had densities well below woo kg/m$^3$, also after pressing.

Optical Properties

Figure 3A:
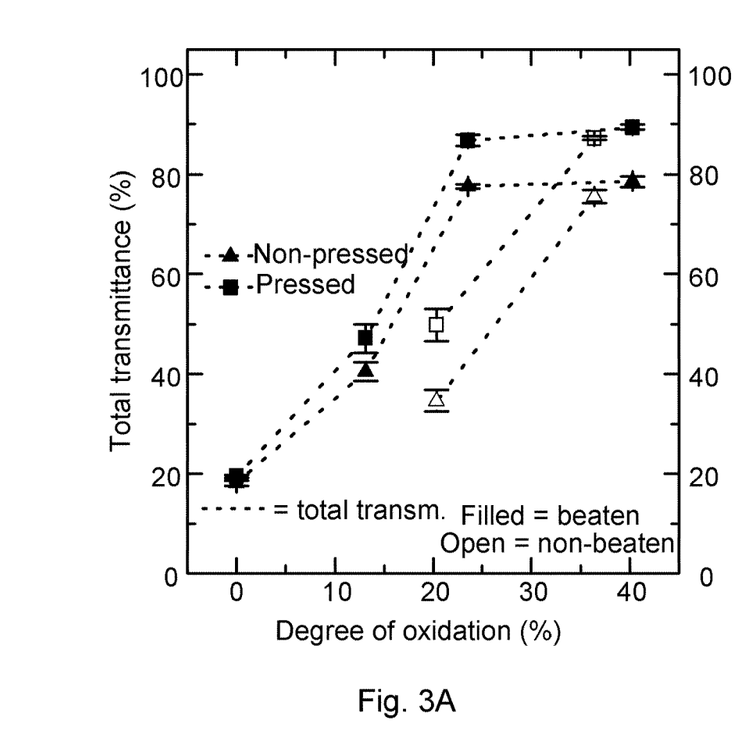
FIG. 3 shows the total transmittance (3A) and haze (3B) of the same sheets as in FIG. 2 (measured at a wavelength of 550 nm). The average sample thickness was 183 and 150 µm for the non-pressed and pressed reference, respectively, and the thickness for all modified samples was in the range of 120-150 µm before pressing and 100-120 µm after pressing.
Figure 3B:
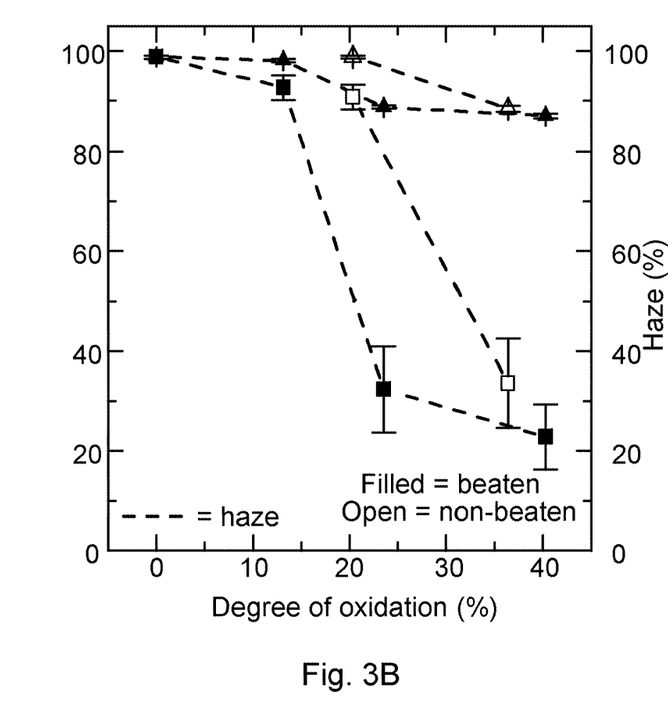

FIG. 3 shows the total transmittance (a) and haze (b) measured at a wavelength of 550 nm for pressed and non-pressed samples. It is shown that the total transmittance increases and the haze decreases when the degree of conversion to dialcohol increases. Further, pressing increases transmittance and decreases haze.

Thermoplasticity

Figure 4A:
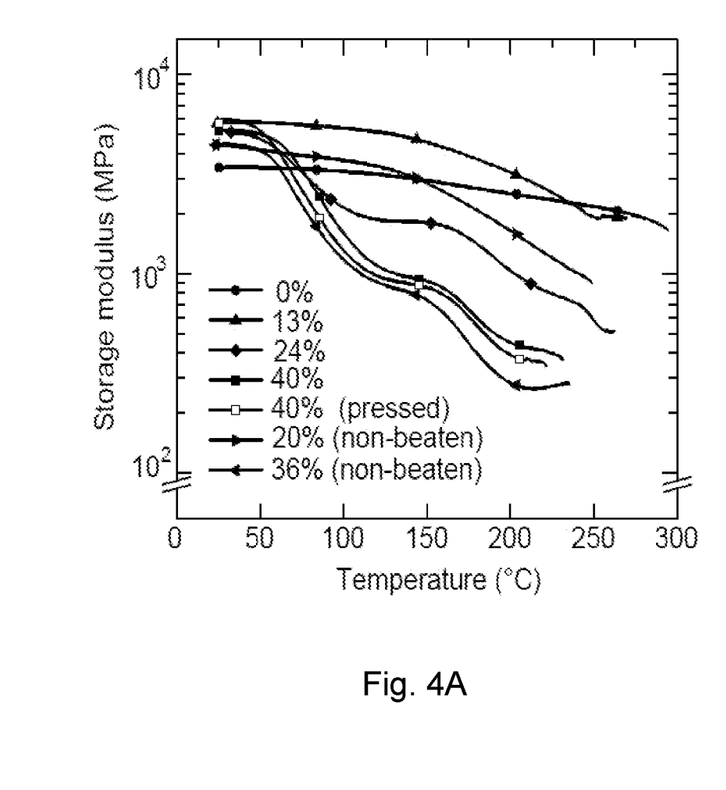
Figure 4B:
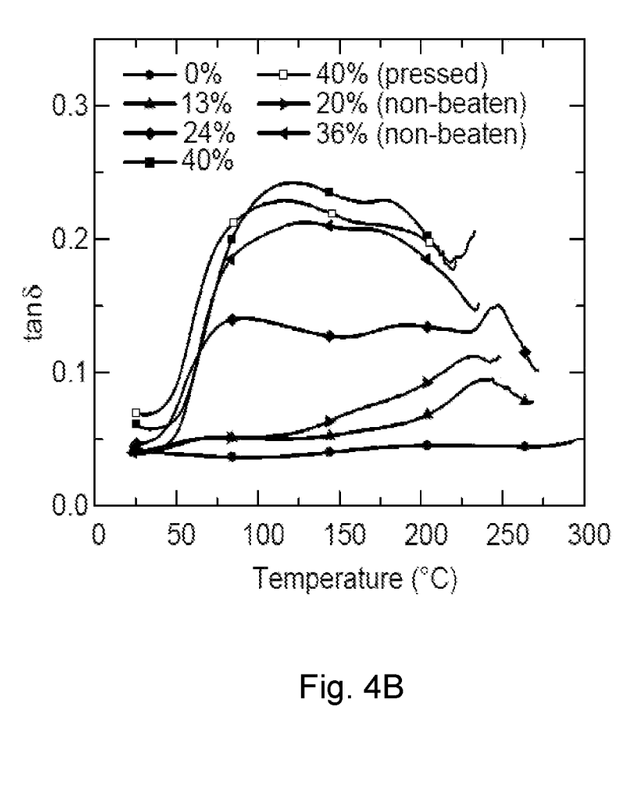

FIG. 4 shows the DMTA of different samples and it may be concluded that the untreated material is more or less unaffected by temperature while an increased degree of modification results in increasingly pronounced thermoplastic features. For samples prepared with a degree of oxidation of 24% or greater, FIG. 4 shows indication of two transitions, one at 70-120° C. and one at 160-180° C., where the first transition can be assumed to be linked to the glass transition of dialcohol cellulose and the latter transition to its flow transition. Altogether this indicates that the material is suitable for press-forming.

Peel Testing

Figure 5B:
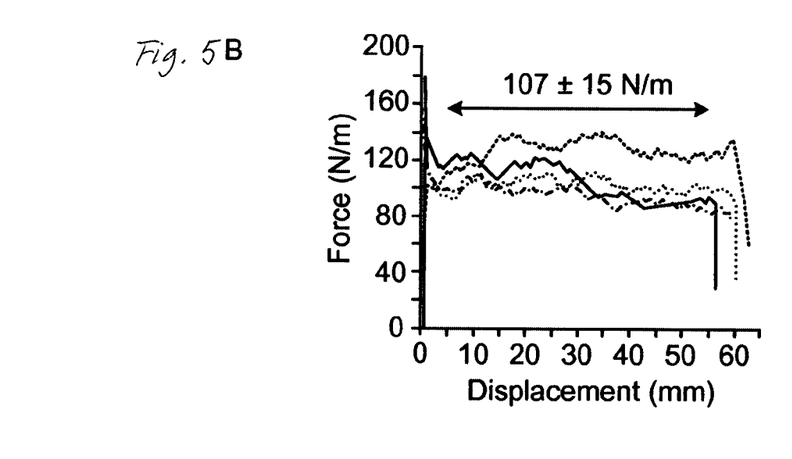
FIG. 5B shows peel-force curves separating two hot-pressed pieces of oxidised-reduced paper (150° C., 16 MPa for 2 min).

FIG. 5B shows that two strips of a sheet of cellulose fibers modified according to the present disclosure attach firmly to each other after hot-pressing. Accordingly, the two pieces were sealed to each other without the aid of an adhesive. Further, the hot-pressed region showed high transparency, which indicate that the seal between the strips is tight.

Oxygen Barrier Properties

TABLE 1

Permeability of sheets of oxidized and reduced fibers before and after pressing. Values are means of four measurements given with 95% confidence limits. The degree of conversion was measured as the degree of oxidization prior to reduction to dialcohol cellulose. The densities of the sheets are shown in FIG. 2.

| | Degree of conversion (%) | Average sample thickness (μm) | Permeability (ml · μm/(m² · kPa · 24 h)) | |
|---|---|---|---|---|
| | | | 50% RH | 80% RH |
| Reference beaten, non-pressed | 0 | 185 ± 15 | Over range | Not measured |
| Reference beaten, pressed | 0 | 158 ± 13 | Over range | Not measured |
| 6 h beaten, non-pressed | 13 | 139 ± 1 | Over range | Not measured |
| 6 h beaten, pressed | 13 | 115 ± 4 | Over range | Not measured |
| 12 h beaten, non-pressed | 24 | 118 ± 5 | <0.6 | 11.8 ± 0.9 |
| 12 h beaten, pressed | 24 | 99 ± 2 | <0.5 | 9.6 ± 0.9 |
| 24 h beaten, non-pressed | 40 | 118 ± 4 | <0.6 | 22.9 ± 2.1 |
| 24 h beaten, pressed | 40 | 113 ± 5 | <0.6 | 20.5 ± 2.0 |
| 12 h non-beaten, non-pressed | 20 | 144 ± 2 | Over range | Not measured |
| 12 h non-beaten, pressed | 20 | 118 ± 3 | Over range | Not measured |
| 24 h non-beaten, non-pressed | 36 | 118 ± 1 | Over range | Not measured |
| 24 h non-beaten, pressed | 36 | 107 ± 4 | <0.6 | 23.4 ± 3.4 |

The sheets of beaten fibers converted to a degree of 24 or 40% showed satisfactory oxygen barrier properties at 50% as well as 80% relative humidity (RH) irrespective of if they had been pressed or not. It is notable that these sheets also have a density above 1200 kg/m³ (see FIG. 2). Sheets of non-beaten fibers converted to a degree of 36% showed satisfactory oxygen barrier properties at 50% as well as 80% relative humidity (RH) after pressing. It is notable that the pressing increased the density of the sheet to above 1200 kg/m³.

The data of Table 1 is based on sheets obtained from a fibre suspension from which fines were removed. It is expected that lower degrees of conversion would have resulted in satisfactory oxygen barrier properties if the fines had not been removed.

The invention claimed is:

1. A method of forming an oxygen barrier, comprising providing a material comprising fibers and having a density of at least 1200 kg/m³, wherein the fibers comprise native cellulose and dialcohol cellulose and the oxygen permeability of the material according to ASTM D3985 is below 30 ml·μm/(m²·kPa·24 h) at 23° C. and 80% relative humidity; wherein the fibers are obtained by a method comprising oxidizing part of the cellulose in a fiber suspension to dialdehyde cellulose followed by reduction of dialdehyde cellulose to obtain the dialcohol cellulose; and wherein the degree of conversion to dialdehyde cellulose is from 18% to 50%; and forming an oxygen barrier with said material by applying said material to a substrate.

2. The method according to claim 1, wherein the fibers are wood fibers.

3. A material comprising fibers and having a density of at least 1200 kg/m³, wherein the fibers comprise native cellulose and dialcohol cellulose and the oxygen permeability of the material according to ASTM D3985 is below 30 ml·μm/(m²·kPa·24 h) at 23° C. and 80% relative humidity;

wherein the fibers are obtained by a method comprising oxidizing part of the cellulose in a fiber suspension to dialdehyde cellulose followed by reduction of dialdehyde cellulose to obtain the dialcohol cellulose; and wherein the degree of conversion to dialdehyde cellulose is from 18% to 50%.

4. The material of claim 3, wherein the degree of conversion to dialdehyde cellulose is from 22% to 50%.

5. The material of claim 3, wherein the degree of conversion to dialdehyde cellulose is from 22% to 40%.

6. The material of claim 3, wherein the density is at least 1250 kg/m³.

7. The material of claim 6, wherein the density is at least 1300 kg/m³.

8. The material of claim 7, wherein the oxygen permeability according to ASTM D3985 is below 10 ml·μm/(m²·kPa·24 h) at 23° C. and 80% RH.

9. The material of claim 3, wherein the oxygen permeability according to ASTM D3985 is below 15 ml·μm/(m²·kPa·24 h) at 23° C. and 80%.

10. The material of claim 9, wherein the oxygen permeability according to ASTM D3985 is below 12 ml·μm/(m²·kPa·24 h) at 23° C. and 80% RH.

11. A paper sheet consisting of the material of claim 3.

12. A paper sheet according to claim 11, wherein the total transmittance is least 40% measured at a wavelength of 550 nm with a Shimadzu UV-2550UV-vis spectrophotometer equipped with its integrating sphere accessory.

13. A paper sheet according to claim 12, wherein the total transmittance is least 60% measured at a wavelength of 550 nm with a Shimadzu UV-2550UV-vis spectrophotometer equipped with its integrating sphere accessory.

14. A multilayered material, comprising a paper sheet according to claim 11.

15. A method for forming a package component with a multilayered material of claim 14 having a three-dimensional shape, comprising the step of press-forming the multilayered material such that it obtains the three-dimensional shape.

16. A method for forming a package with a multilayered material of claim 14, comprising the step of heat-sealing the multilayered material.

17. A method for forming a package component with a paper sheet of claim 11 having a three-dimensional shape, comprising the step of press-forming the paper sheet such that it obtains the three-dimensional shape.

18. A method for forming a package with a paper sheet of claim 11, comprising the step of heat-sealing the paper sheet.

19. A packaging material comprising a substrate provided with a coating consisting the material according to claim 3.

20. A method for forming a package component with a packaging material of claim 19 having a three-dimensional shape, comprising the step of press-forming the packaging material such that it obtains the three-dimensional shape.

21. A method for forming a package with a packaging material of claim 19, comprising the step of heat-sealing the packaging material.

22. The material of claim 3, wherein the degree of conversion to dialdehyde cellulose is from 22% to 49%.

23. The material of claim 3, wherein the degree of conversion to dialdehyde cellulose is from 24% to 45%.

* * * * *